US012695728B2

(12) United States Patent
Huang et al.

(10) Patent No.: US 12,695,728 B2
(45) Date of Patent: Jul. 28, 2026

(54) PRIVACY PRESERVING GROUP-BASED CONTENT DISTRIBUTION

(71) Applicant: Google LLC, Mountain View, CA (US)

(72) Inventors: Wei Huang, Kirkland, WA (US); Michael William Daub, Woodinville, WA (US); Robert F. Day, Bellevue, WA (US); Arthur Asuncion, Bothell, WA (US)

(73) Assignee: Google LLC, Mountain View, CA (US)

( * ) Notice: Subject to any disclaimer, the term of this patent is extended or adjusted under 35 U.S.C. 154(b) by 79 days.

(21) Appl. No.: 18/008,607

(22) PCT Filed: Jun. 2, 2022

(86) PCT No.: PCT/US2022/031921
§ 371 (c)(1),
(2) Date: Dec. 6, 2022

(87) PCT Pub. No.: WO2023/234940
PCT Pub. Date: Dec. 7, 2023

(65) Prior Publication Data
US 2024/0163259 A1 May 16, 2024

(51) Int. Cl.
*H04L 67/50* (2022.01)
*H04L 9/40* (2022.01)
(52) U.S. Cl.
CPC ........ *H04L 63/0407* (2013.01); *H04L 67/535* (2022.05)
(58) Field of Classification Search
CPC .......................... H04L 67/535; H04L 63/0407
See application file for complete search history.

(56) References Cited

U.S. PATENT DOCUMENTS 11,137,886 B1 * 10/2021 Richards ................. H04L 67/53
2012/0041969 A1 2/2012 Priyadarshan et al.
(Continued)

FOREIGN PATENT DOCUMENTS

WO WO 2022031329 2/2022

OTHER PUBLICATIONS

Acuityads.com [online], "Defining segments to improve ad targeting" available on or before Oct. 30, 2017, via Internet Archive: Wayback Machine URL <http://web.archive.org/web/20201024025339/ https://www.acuityads.com/blog/2017/10/30/defining-segments-improve-ad-targeting/>, 9 pages.
(Continued)

*Primary Examiner* — Emmanuel L Moise
*Assistant Examiner* — Xiang Yu
(74) *Attorney, Agent, or Firm* — Fish & Richardson P.C.

(57) ABSTRACT

Methods, systems, and apparatus, including computer programs encoded on a computer storage medium for displaying digital components on client devices based on predicted user attributes of users are described. In one aspect, a method includes updating, at a client device of a user, a list of user group identifiers for the user to include a particular user group identifier that identifies a particular user group. A determination is made, for each user attribute of multiple user attributes, a score based on a quantity of user groups identified in the list of group identifiers for the user that include, as a membership attribute, the user attribute. A digital component request including data representing the list of user-group identifiers is sent to a content distribution system. Digital component data identifying a set of digital components selected based on the data of the digital component request is received.

21 Claims, 4 Drawing Sheets

(56) References Cited

U.S. PATENT DOCUMENTS

| | | | |
|---|---|---|---|
| 2013/0124298 A1 | 5/2013 | Li et al. | |
| 2015/0287091 A1* | 10/2015 | Koran ................ | G06Q 30/0277 |
| | | | 705/14.66 |
| 2016/0117736 A1* | 4/2016 | Dasdan .............. | G06Q 30/0269 |
| | | | 705/14.66 |
| 2016/0171534 A1* | 6/2016 | Linden .............. | G06Q 30/0255 |
| | | | 705/14.53 |
| 2018/0288034 A1* | 10/2018 | Edwards ................ | H04W 4/23 |
| 2022/0092172 A1* | 3/2022 | Tsuchida ................ | G06F 21/54 |

OTHER PUBLICATIONS

Adtechexplained.com [online], "What is FLEDGE? Google FLEDGE Explained" Mar. 2021, retrieved on Feb. 9, 2023, retrieved from URL <https://adtechexplained.com/fledge-explained/>, 16 pages.

Github.com [online], "FLEDGE.md" Jan. 2021, retrieved on Feb. 9, 2023, retrieved from URL <https://github.com/WICG/turtledove/blob/main/FLEDGE.md#31-fetching-real-time-data-from-a-trusted-server>, 33 pages.

International Search Report and Written Opinion in International Appln. No. PCT/US2022/031921, mailed on Jan. 23, 2023, 15 pages.

Mixpanel.com [online], "User segmentation: A guide to understanding your customers" available on or before Aug. 14, 2020, via Internet Archive: Wayback Machine URL <http://web.archive.org/web/20200814201443/https://mixpanel.com/blog/user-segmentation-guide-understanding-customers-2/>, 12 pages.

International Preliminary Report on Patentability in International Appln. No. PCT/US2022/031921, mailed on Dec. 12, 2024, 9 pages.

* cited by examiner

300

310 — Update a list of user-group identifiers.

320 — Determine a score for each user attribute

330 — Send a digital component request to a content distribution system.

340 — Receive digital component data for a set of digital components.

350 — Select one or more of the digital components from the set of digital components.

360 — Display one or more digital components.

PRIVACY PRESERVING GROUP-BASED CONTENT DISTRIBUTION

CROSS-REFERENCE TO RELATED APPLICATIONS

This application is a National Phase of International Application No. PCT/US2022/031921, filed Jun. 2, 2022, the entirety of which is hereby incorporated by reference.

BACKGROUND

This specification relates to data processing and preserving user privacy and data security.

A client device can use an application (e.g., a web browser, a native application) to access a content platform (e.g., a search platform, a social media platform, or another platform that hosts content). The content platform can display, within an application launched on the client device, digital components (a discrete unit of digital content or digital information such as, e.g., a video clip, an audio clip, a multimedia clip, an image, text, or another unit of content) that may be provided by one or more content source/ platform.

SUMMARY

In general, one innovative aspect of the subject matter described in this specification can be embodied in methods including the operations of updating, at a client device of a user, a list of user group identifiers for the user to include a particular user group identifier that identifies a particular user group, from among multiple different user groups, based on predicted user attributes of the user and content accessed by the user during a current period of user activity on the client device, wherein each user group in at least a subset of the multiple user groups has membership attributes that include at least one of (i) a set of one or more user attributes or (ii) one or more topics, wherein the list of user group identifiers includes user group identifiers for user groups that include the user as a member; determining, for each user attribute of multiple user attributes, a score based on a quantity of user groups identified in the list of group identifiers for the user that include, as a membership attribute, the user attribute; sending, to a content distribution system, a digital component request including data representing the list of user-group identifiers; receiving, from the content distribution system, digital component data identifying a set of digital components selected based on the data of the digital component request; selecting, based on the data identifying the set of digital components and the score for each user attribute, one or more of the digital components; and displaying the one or more digital components. Other embodiments of this aspect include corresponding methods, apparatus, and computer programs, configured to perform the actions of the methods, encoded on computer storage devices.

These and other embodiments can each optionally include one or more of the following features. In some aspects, the membership attributes of each user group includes a combination of (i) a hash value computed based on a subset of the set of one or more user attributes of the user group and a subset of the one or more topics of the user group, and (ii) a complement of the subset of the set of one or more user attributes of the user group and a complement of the subset of the one or more topics of the user group.

Some aspects include determining the score for each user attribute based on respective weights assigned to the user attributes. The respective weight of a user attribute can indicate a priority of the user attribute with respect to other user attributes.

Some aspects include selecting one or more of the digital components based on the data identifying the set of digital components that includes adjusting a selection value for each digital component in the set of digital components based on the score for each user attribute of the set of one or more user attributes for the user group.

Some aspects include adjusting the selection value for each digital component in the set of digital components by increasing the selection value of a given digital component based on the set of one or more user attributes including a particular user attribute having a score that exceeds the scores of other user attributes.

Some aspects include adjusting the selection value for each digital component in the set of digital components by decreasing the selection value of a particular digital component based on the set of one or more user attributes including a particular user attribute having a score is less than the scores of other user attributes.

Some aspects include selecting the one or more digital components based on the data identifying the set of digital components and the score for each user attribute from a combination of the set of digital components and an additional set of digital components selected based on contextual signals related to an electronic resource with which the one or more digital components are displayed. In some aspects, the data of the digital component request includes the contextual signals.

Particular embodiments of the subject matter described in this specification can be implemented so as to realize one or more of the following advantages. Users can be assigned to user groups based on predicted user attributes of the users and/or based on topics of interest to the user. As this information may be deemed sensitive, information indicating the user group membership of a user can be stored only on the user's device, rather than being maintained by third parties, thereby maintaining user privacy and anonymity. To customize digital components provided to the user based on user group membership, the information can be sent, e.g., in encrypted form, to a trusted server that can select and provide digital components for display to the user based on the user group membership. In some implementations, the user group membership information can be sent to multiparty computation (MPC) servers in the form of secret shares and the MPC servers can perform a secure MPC process to select digital components based on the user group membership of the user. By sending the information in secret shares, no entity including the MPC servers can access the user group membership absent unauthorized collusion between the MPC servers, thereby enhancing the user privacy and data security. The techniques described in this document enhance user privacy and data security relative to techniques that employ cookies to collect information about user interests as the cookies can be used to identify the client device, thereby compromising user privacy and anonymity and the cookies carry user information outside of the user's device. A problem addressed by the techniques described in this document may be considered to be how to deliver digital components to a user whilst maintaining user privacy and data security. A technical effect of the techniques is to deliver digital components to a user based on user groups assigned to the user relating to predicted user attributes and/or topics of interest to the user, rather than a cookie that may uniquely identify the user.

Since a client device can be a member of multiple user groups, the techniques and methods described in this document use hashing to reduce the memory required by the client device to store the user group list. Besides hashing the techniques also include merging of multiple user groups so as to reduce the size of the user group list.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
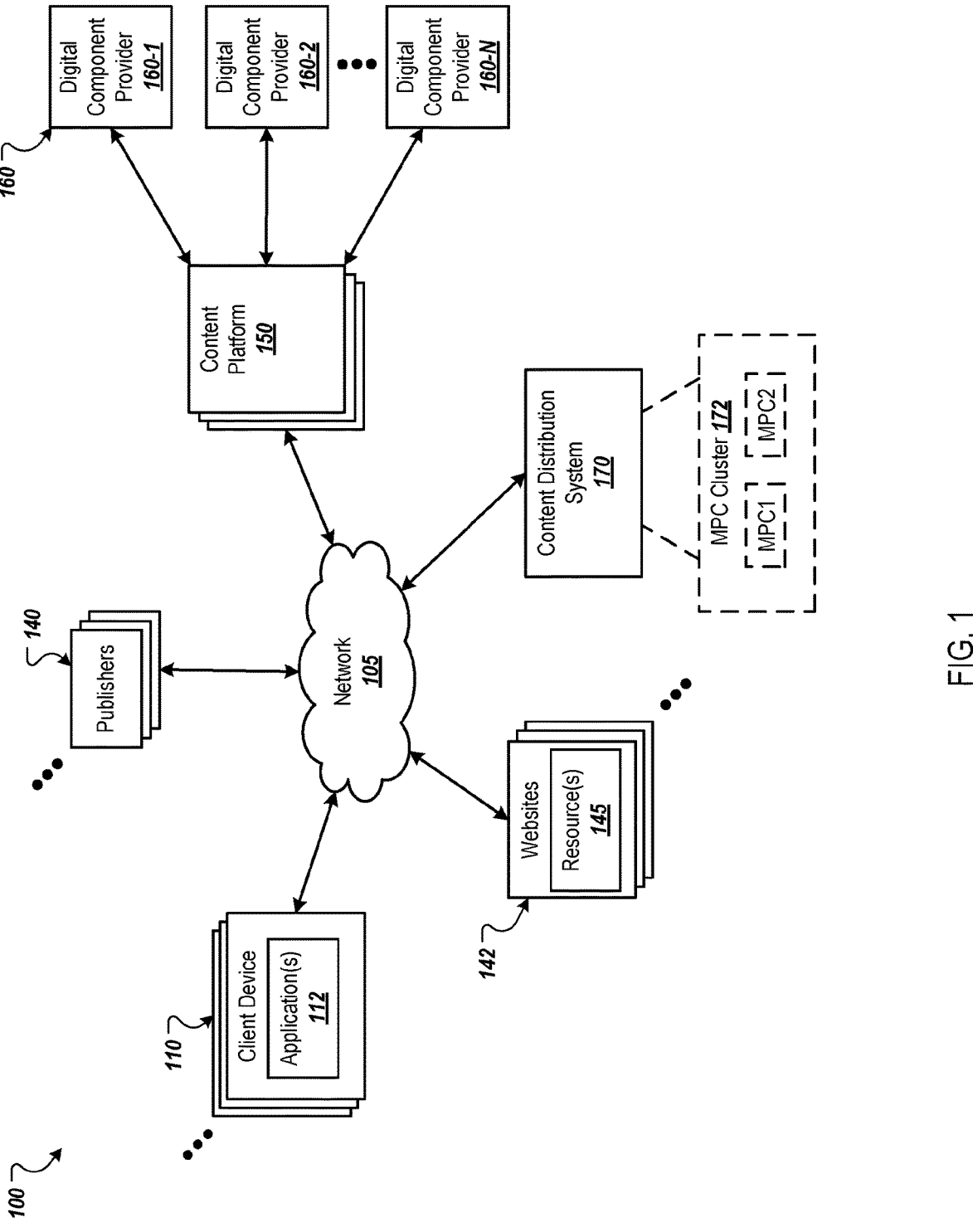
FIG. 1 is a block diagram of an example environment in which digital components are distributed.

FIG. 1 is a block diagram of an example environment 100 in which digital components are distributed. The example environment 100 includes a data communication network 105, such as a local area network (LAN), a wide area network (WAN), the Internet, a mobile network, or a combination thereof. The network 105 connects client devices 110, publishers 140, websites 142, content platforms 150, and a content distribution system 170. The example environment 100 can include many different client devices 110, publishers 140, websites 142, and content platforms 150, digital component providers 160-1 to 160-N, and content distribution systems 170. In some implementations, the content distribution system 170 can include or be implemented as a MPC cluster 172 that includes multiple multiparty computation computers, e.g., MPC1 and MPC2.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hot word" or "hot phrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, or a gaming device or console.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from the content distribution system 170 and/or one or more content platforms 150 for presentation to a user of the client device 110. For example, the code of a digital component slot can enable the client device 110 to generate a packetized data request including a header and payload data. The application 112 can request digital components from the content distribution system 170 and/or the content platform(s) 150.

To request digital components from the content platform 150, the application 112 can generate a contextual digital component request that is transmitted to the content platform 150. The contextual digital component request can include event data specifying features such as a name (or network location) of a server from which media is being requested. The contextual digital component request can be transmitted, by the application 112 of the client device 110, over the network 105 to a server of the content platform 150.

The contextual digital component request can include event data specifying other event features, such as the electronic document being requested and characteristics of locations of the electronic document at which digital component can be presented. For example, the event data can include a reference (e.g., Uniform Resource Locator (URL)) to an electronic document (e.g., webpage or application) in which the digital component will be presented, available locations of the electronic documents that are available to present digital component, sizes of the available locations, and/or media types that are eligible for presentation in the locations can be provided to the content platform 150. Similarly, the event data can include keywords associated with the electronic document ("document keywords") or entities (e.g., people, places, or things) that are referenced by the electronic document can also be included in the digital component request (e.g., as payload data) and provided to the content platform 150 to facilitate identification of digital components that are eligible for presentation with the electronic document. The event data can also include a search query that was submitted from the client device 110 to obtain search results and/or data specifying search results and/or textual, audible, or other visual content that is included in the search results.

Contextual digital component requests can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device).

The content platforms 150 can include supply-side platforms (SSPs) and/or demand-side platforms (DSPs). In general, the content platforms 150 manage the selection and distribution of digital components on behalf of publishers 140 and digital component providers 160-1 to 160-N. Some publishers 140 use an SSP to manage the process of obtaining digital components for digital component slots of its resources and/or applications. An SSP is a technology platform implemented in hardware and/or software that automates the process of obtaining digital components for the resources and/or applications. Each publisher 140 can have a corresponding SSP or multiple SSPs. Some publishers 140 may use the same SSP.

Digital component providers 160 can create (or otherwise publish) digital components that are presented in digital component slots of publisher's resources and applications. The digital component providers 160 can use a DSP to manage the provisioning of its digital components for presentation in digital component slots. A DSP is a technology platform implemented in hardware and/or software that automates the process of distributing digital components for presentation with the resources and/or applications. A DSP can interact with multiple supply-side platforms SSPs on behalf of digital component providers 160 to provide digital components for presentation with the resources and/or applications of multiple different publishers 140. In general, a DSP can receive requests for digital components (e.g., from an SSP), generate (or select) a selection parameter for one or more digital components created by one or more digital component providers based on the request, and provide data related to the digital components (e.g., the digital components itself) and the selection parameters to an SSP. The SSP can then select one or more digital components and transmit data related to the digital components and the selection parameters to the client device 110.

In some cases, it is beneficial to a user to receive digital components related to web pages, application pages, or other electronic resources previously visited and/or interacted with by the user, or that is otherwise considered to be related to a topic of interest to the user. In order to distribute such digital components to users, the users can be assigned to user groups, e.g., when the users visit particular resources or perform particular actions at the resources (e.g., interact with a particular item presented on a web page or add the item to a virtual cart). The user groups can be generated by the digital component providers 160-1 to 160-N. That is, each digital component provider 160-1 to 160-N can assign users to their user groups when the users visit electronic resources of the digital component providers 160.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

To protect user privacy, a user's group membership can be maintained at the user's client device 110, e.g., by one of the applications 112, rather than by a digital component provider or other party. In a particular example, a web browser or native application can maintain a list of user group identifiers ("user group list") for a user. The user group list can include a user group identifier for each user group to which the user has been added. The digital component providers 160 that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored.

When the application 112 presents a resource or application content related to a digital component provider 160, or a web page on a website 142, the resource can request that the application 112 add one or more user group identifiers to the user group list. In response, the application 112 can add the one or more user group identifiers to the user group list and store the user group list securely.

To request digital components from the content distribution system 170, application 112 can generate a second digital component request that is transmitted to the content distribution system 170. In some implementations, the content distribution system 170 can include or be implemented as a trusted computing system that is deemed trusted by other parties in the environment 100. The application 112 can encrypt user group identifiers from the user group list and include the encrypted user group identifiers in the digital component request. The application 112 can encrypt the user group identifiers using an encryption key of the trusted computing system. This digital component request is then transmitted to the trusted computing system.

The trusted computing system can decrypt the user group identifiers using a decryption key that corresponds to the encryption key and use the user group identifiers to select digital components for presentation at the client device 110. In some implementations, the trusted computing system can store beforehand digital components from the content platforms 150 and/or digital component providers 160 so as to avoid any delay in interaction while responding to the digital component request. The trusted computing system in response to receiving the digital component request from the application 112, selects a set of one or more digital components based on the user group membership of the user of the client device 110. The trusted computing system selects a set of digital components based on the user group membership of the user, identifies or generates a selection value (referred to as a primary selection value) for each digital component in the set of digital components, and identifies or generates one or more conditional selection values along with rules of using the one or more conditional selection values for each digital component in the set of digital components. The trusted computing system transmits the digital components, primary selection values, and/or conditional selection values to the client device 110.

In some implementations, the content distribution system 170 can include or be implemented as a MPC cluster 130 that includes multiple computing systems for selecting digital components for presentation at the client device 110. The MPC cluster 130 can use the user group membership of a user to select digital components or other content that can be of interest to the user or can be beneficial to the user/user device in another way. For example, such digital components or other content can include data that improves a user experience, improves the running of a user device or benefits the user or user device in some other way.

The user group identifiers of the user group list of a user can be provided in ways that prevent the computing systems of the MPC cluster 130, or any other entities, from correlating user group identifiers with particular users, thereby preserving user privacy when using user group membership data to select digital components. For example, user group membership can be provided as secret shares that prevent the computing systems of the MPC cluster 130 from accessing the user group identifiers for the user in cleartext, thereby preserving user privacy when using user group membership data to select digital components. Cleartext is text that is not computationally tagged, specially formatted, or written in code, or data, including binary files, in a form that can be viewed or used without requiring a key or other decryption device, or other decryption process.

In some implementations, the MPC cluster 130 includes two computing systems MPC1 and MPC2 (e.g., server computers) that perform secure MPC processes to select digital components for distribution to client devices of users based on the user's group membership, but without accessing the group membership information in cleartext. Although the example MPC cluster 130 includes two computing systems, more computing systems can also be used as long as the MPC cluster includes more than one computing system. For example, the MPC cluster 130 can include three computing systems, four computing systems, or another appropriate number of computing systems. Using more computing systems in the MPC cluster 130 can provide more security, but can also increase the complexity of the MPC processes.

In response to receiving the digital component request and/or using information included in the digital component request (e.g., secret shares of the user group membership), the computing systems of the MPC system can perform one or more MPC processes to select a set of digital components for transmission to the client device 110. The MPC cluster 130 selects data related to the digital components in the set of digital components, a primary selection value for each digital component in the set of digital components, one or more conditional selection values along with rules of using the one or more conditional selection values for each digital component in the set of digital components and transmits them to the client device 110 in secret shares. For e.g., each computing system of the MPC cluster 130 can transmit its share of data and selection values to the client device 110. The client device 110 after receiving the secret shares can combine the secret shares to generate clear text values of the data related to the digital components in the set of digital components, a primary selection value for each digital component in the set of digital components, one or more conditional selection values along with rules of using the one or more conditional selection values for each digital component in the set of digital components.

In some implementations, the number and types of user groups can be managed and/or controlled by a system (or administrator). However in other implementations, the number and types of user groups can be managed by the digital component provider 160, content platform 150, or other party. For example, assume that a user of the client device 106 uses a browser-based application 112 to load a webpage of a shoe manufacturer published by a web server. Assume that the user is browsing through sneaker shoes on the webpage. The web server in response can request the application 112 to add the user to a user group dedicated to users interested in sneaker shoes and which is identified by a user group identifier "sneaker shoes." If the application 112 accepts the request, the user group identifier "sneaker shoes" is added to the user group list for the user, which is maintained by the application 112. Similarly, if the user is browsing through sandals on the webpage, the web server can request the application 112 of the client device 110 to add the user to a user group dedicated to users interested in sandals and which is identified by a user group identifier "sandals." If the application 112 accepts the request, the user group identifier "sandals" is added to the user group list. Likewise, the web server (or the publisher of the webpage) can manage multiple such user groups that primarily depends on the business use case and/or choice.

User groups are generally based on user interest i.e., users are assigned to user groups based on previous digital content accessed by the user, e.g., by being assigned to groups associated with topics of interest to the user. In some implementations, the user group membership of the user can be based on user attributes of the user. In some implementations, the user attributes can include demographic attributes such as age, gender, geographical location etc. For assigning a user to user groups without knowing the actual user attributes of the user, the digital component provider 160 can predict the users' attributed based on the resources, e.g., web pages, of the digital component provider 160 accessed by the user and/or user interactions with these resources. For example, if the user of the client device 110 uses the application 112 to visit a website 142 of the digital component provider 160, the web server hosting the website 142 can analyze the activity of the user on the website 142 to determine one or more predicted user attributes and request the application 112 to add the user to user groups that are based on the predicted user attributes.

For example, the digital content provider 160 can create user groups that each include users with a particular shoe size. For example, digital component provider 160 such a website selling shoes can create user groups that can be identified using user group identifiers "Shoe Size US 11.5", "Shoe Size US 9.5" and "Shoe Size US 7.5". In this example, users assigned to the user group "Shoe Size US 11.5" are users that have a predicted user attribute of shoe size being US 11.5, e.g., based on the user selecting shoes with this size at the website. Similarly, users assigned to the user groups "Shoe Size US 9.5" and "Shoe Size US 7.5" are users that have a predicted user attribute of shoe size being US 9.5 and US 7.5, respectively. In another example, the digital content provider 160 such as a clothing brand selling clothes online can create a user group "T-shirt US XL." Such a user group can include users that have a predicted user attribute of T-shirt size being XL, e.g., based on the user selecting t-shirts that have a size of XL. As for another example, the digital content provider 160 can create user groups that includes users of a particular predicted age group. For example, the digital component provider 160 can create a user group that includes users that have a predicted age between 20-35 years. Such a user group can be identified for e.g., using a user group identifier such as "Age 20-35".

To further elaborate user membership according to the above examples, suppose a user is interested in purchasing shoes. The user can use a browser-based application 112 to visit a website 142 of a footwear manufacturer published by a web server. If the user browses through a particular shoe and adds the particular shoe of size "US 11.5" to the cart, the web server can predict that the user has a shoe size of US 11.5 and can request the browser application 112 of the client device 110 to add the user to a user group "Shoe Size US 11.5". If the browser application 112 accepts the request, the user group identifier "Shoe Size US 11.5" is added to the user group list.

In some implementations, after being requested to add the user of the client device 110 to a particular user group, the application 112 of the client device 110 can determine whether or not to add the user group identifier of the particular user group to the user group list. For example, the application 112 can be configured by the user to consider one or more conditions and/or settings before adding a user group identifier to the user group list. For example, the user of the client device 110 can configure the application 112 to prevent and/or allow addition of user group identifier to the user group list.

In some implementations, the digital content provider 160 can create user groups based on both user interests (e.g., topics of interest) and user attributes. For example, a user assigned to a user group such as "T-shirt US XL Brand A" is a user who is interested in a t-shirt of a brand A and has a user attribute of t-shirt size XL. In another example, the digital component provider 160 can create a user group that includes users that for e.g., are users belonging to an age group 50-70 years and are interested in jogging. Such a user group can have a user group identifier such as "Age 50-70 Jogger." Any number and combination of user attributes and topics of interest can be used as characteristics of the members of the users that are members of the group. As the user attributes and interests are typically predicted, a user group may include users that are predicted to have those attributes and/or interests, but do not actually have those attributes and/or interests.

To determine whether to add a user to user groups that are generated based on user interest(s) and user attribute(s), the digital component provider 160 can analyze the user's online activity at the digital component provider's resources and predict the user interests and/or user attributes. After determining one or more predicted user attributes and user interests, the web server or the website 142 can request the application 112 of the client device 110 to assign the user to the user group.

As seen in the above examples, the digital component provider 160 can generate multiple user groups where each user group is a combination of one or more user attributes and one or more user interests. This can result in the user group list of the application 112 growing larger by including more and more identifiers in the user group list. Since the user group list is stored in the client device 110, the digital component provider 160 can improve the user group identifiers so as to reduce memory requirement required to store the user group list.

In some implementations, the digital component provider 160 can use a hash function to generate hash values of the user group identifiers. The hash values take less memory which is why they can then be used as user group identifiers in the user group list of the client device 110. For example, assume that there is one predicted user attribute for e.g., shoe size US 11.5 and one user interest for e.g., sneakers. The digital component provider 160 can generate 3 user groups based on user attribute shoe size US 11.5 and user interest sneakers. These user groups can be a user group based on user attribute that for e.g., has a user group identifier "Shoe size US 11.5", a user group based on user interest that has a user group identifier "Sneakers" and a user group based on both user attribute shoe size US 11.5 and user interest sneakers that has a user group identifier "Shoe size US 11.51 Sneakers". If a client device 110 has to store all three of these user group identifiers in the user group list, it may require approximately 53 bytes (424 bits). In contrast, only 2 bits can be used to uniquely identify three user groups. Generally there are lot more user groups based on all permutations and combinations of the user attributes and topics of interest. To reduce the amount of data storage used to store the user group identifiers and the amount of data sent across the network, the digital component providers 160 can use hash functions to generate unique user group identifiers for each of the user groups without collision.

In some implementations, instead of generating user groups based on all permutations and combinations of the user attributes and topics of interest, the digital component provider 160 can select user groups having common user attributes and topics of interest. The digital component provider 160 can then generate a hash value based on the common user attributes and topics of interest thereby generating a hash value representation that can uniquely identify the combinations of common user attributes and topics of interest.

In such implementations, the bit-length of the hash values can be pre-determined by the digital component provider 160. If the bit-length of the hash values is small, the hash values consume lesser memory and storage space. The hash values can then be used as user group identifiers and stored in the user group list of the client device 110 thereby saving memory space of the client device 110. For example, two user groups "Age 50-60 Sneakers Canada" and "Age 50-60 Sneakers Japan" have same user attributes "Age: 50-60" and topic of interest "Sneakers." The digital component provider 160 can generate a hash value using the user attributes (Age: 50-60) and topic of interest (Sneakers) that are common in both the user groups. If the generated hash value is for example, "XYZ", the user group identifiers for the two user groups can be "XYZ Canada" and "XYZ Japan". Note that the memory required to store a user group identifier such as "Age 50-60 Sneakers Canada" is more than the memory required to store a user group identifier "XYZ Canada" based on the number of bits used for the representation.

To further improve the user group identifiers so as to reduce memory requirements for storing the user group list, the digital component provider 160 can use techniques such as locally sensitive hashing (LSH) to hash two or more user group identifiers into a single user group identifier. For example two user groups "Age 50-60 Sneakers" and "Age 40-50 Sneakers" differ slightly in the range of the user attribute "Age." The digital component provider 160 can use LSH techniques to hash the two identifiers "Age 50-60 Sneakers" and "Age 40-50 Sneakers" into a single hash value that can be used as an identifier for a user group that includes users from the user groups "Age 50-60 Sneakers" and "Age 40-50 Sneakers."

In some implementations, the digital component provider 160 can combine two or more user groups if the user groups are based on common user attributes and topics of interests. For example, if the one or more user attributes and the topics of interests of two or more user groups are identical, the digital component provider 160 can combine the two or more user groups to create a single user group. This can reduce the number of user groups maintained by the digital component provider 160 thereby also reducing the size of the user group list as there are lesser number of user groups for the application 112 to be a member of and consequently a lesser number of user group identifiers in the user group list. For example, if there are four original user groups such as "Age 50-60 Sneakers Brand A", "Age 50-60 Sneakers Brand B", "Age 40-50 Sneakers Brand A" and "Age 40-50 Sneakers Brand B" that differ slightly in the range of the user attribute age and the brand of the sneakers, the digital component provider 160 can combine the four user groups to create a two user groups "Age 40-60 Sneakers Brand A" and "Age 40-60 Sneakers Brand B" and update the user group membership of the users in the four original user groups. Note that such a techniques reduces the total number of user groups that can be added to the user group list of the client device 110.

When the application 112 loads a website that includes one or more digital component slots, the application 112 can generate and transmit a contextual digital component request for each of the one or more digital component slots to the content platform 150 and a user group membership based digital component request to the content distribution system 170. In response to receiving the contextual digital component request, the content platform 150 returns data related to one or more digital components and a primary selection value for each of the one or more digital components. Note that these one or more digital components are selected based on the contextual signals included in the digital component request. In response to receiving the user group based digital component request, the content distribution system 170 returns data related to digital components in a set of digital components, a primary selection value for each digital component in the set of digital components, one or more conditional selection values along with rules of using the one or more conditional selection values for each digital component in the set of digital components. Note that the content distribution system 170 selects the digital components in the set of digital components based on the user group membership of the user of the client device 110.

In some implementations, after receiving digital components from the content platform 150 and the content distribution system 170, the application 112 can select digital components for the digital component slots based on the selection value of the digital components. For example, the application 112 can select a digital component for a digital component slot that has a highest selection value among the received digital components. For brevity, the following explanation is based on a single digital component slot that can accommodate a single digital component for which the application 112 of the client device 110 generates and transmits a contextual digital component request to the content platform 150 and a user group based digital component request to the content distribution system 170. In response, the application 112 receives a digital component from the content platform 150 and a set of digital components from the content distribution system 170.

In some implementations, the application 112 can use the conditional selection values rather than the primary selection value of the digital components during the selection process. The use of conditional selection values can be subject to rules stated by the digital component provider 160 that provides the digital component. Prior to using the conditional selection values of the digital components, the application 112 can generate and assign a score for each user attribute based on the user group membership of the user of the client device 110. For example, the application 112 can identify one or more user attributes from the user group identifiers in the user group list and score each user attribute based on the quantity of user-groups identified in the user group list that includes the user attribute as a characteristic of members of the user group. That is, the score for a user attribute can represent the quantity of user groups that the user has been assigned to that includes that user attribute. In other words, the score for a user attribute can represent how often publishers and/or digital component providers predicted that the user has that user attribute. The scoring technique is further explained with reference to FIG. 2.

Figure 2:
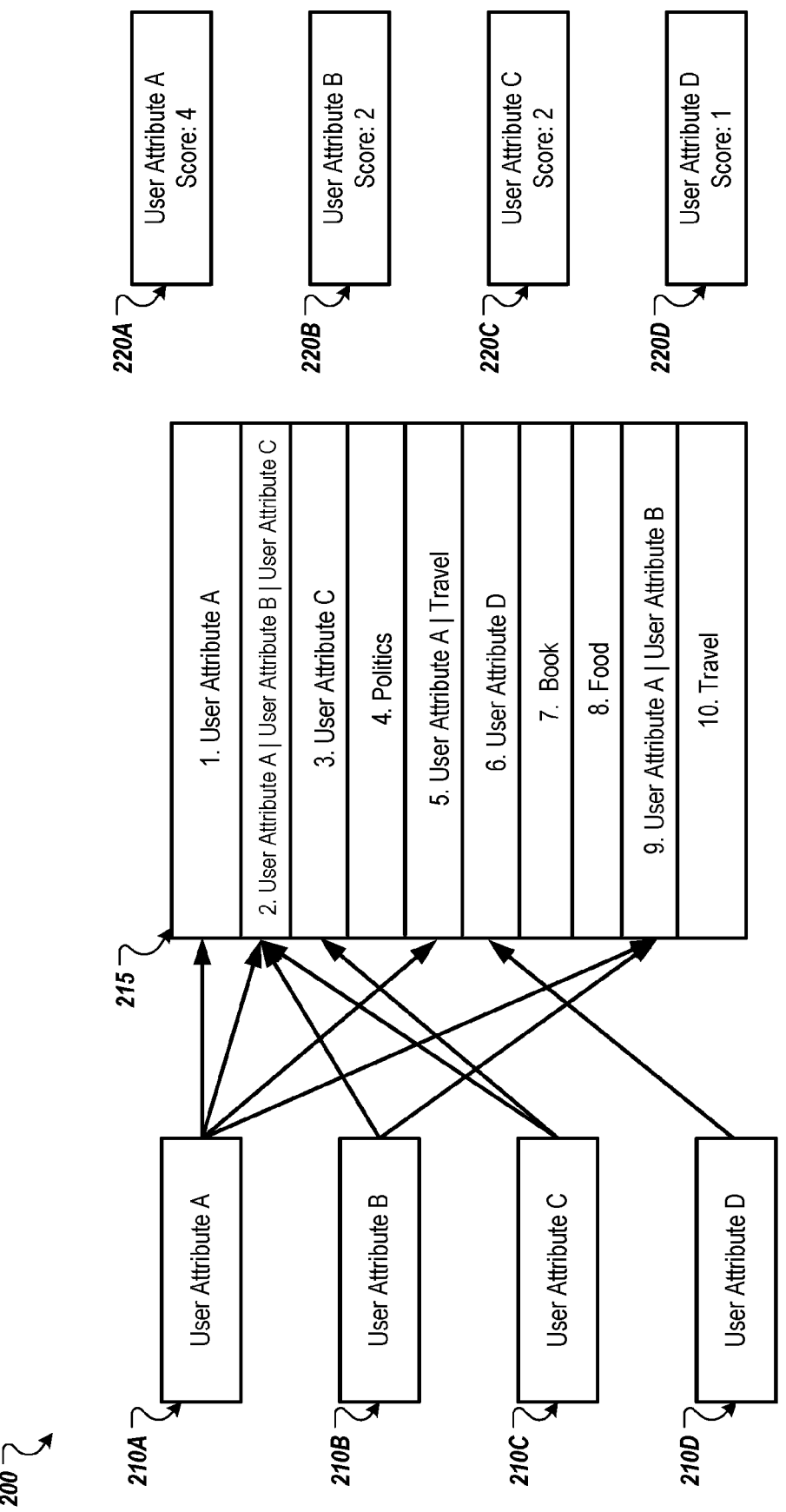
FIG. 2 is an example diagram illustrating the scoring of user attributes.

FIG. 2 is an example diagram illustrating the scoring of user attributes. The scoring of each user attribute can be based on the number of user groups that include the user attribute as a characteristic of its members and that includes the user of the client device as a member. In this example, the application 112 can identify one or more user attributes such as user attributes A-D as indicated in FIG. 2 by 210A-D. Note that the techniques and methods described herein may not allow distribution of the user attributes of the user of the client device 110 off of the client device 110, thereby maintaining user privacy.

FIG. 2 also shows the user group list 215 maintained by the application 112 on the client device 110. The user group list 215 includes ten user group identifiers (indexed from 1 to 10) that identify user groups such as "User Attribute A" that includes users that are determined to be have the user attribute A. Similarly there is a user group identifier such as "User Attribute A Travel" that identifies a user group that includes users that are determined to have user attribute A and are interested in travelling. Similarly there is a user group identifier such as "User Attribute A|User Attribute B|User Attribute C" that identifies a user group that includes users that are determined to have user attributes A, B and C. This example also includes user group identifiers such as "Food", "Books", "Politics" and "Travel" that identifies user groups that includes users that are interested in food, books, politics and travelling, respectively.

In this example, the user of the client device 110 has been added to the ten user groups shown in FIG. 2. Some of the example user groups are for particular topics of interest (e.g., group 4 for politics), some are for user attributes (e.g., group 1 for user attribute A), and some are for a combination of user attribute(s) and topic(s) (e.g., group 5 for user attribute A and the topic of travel).

As a whole, the ten user groups indicate that the user was added to user groups that have user attributes A-D as at least one user group in the list 215 includes each of these user attributes A-D. Thus, in this example, the user has been predicted to have each of these attributes.

In some implementations, the score assigned to a user attribute is based on the quantity of user groups in the list 215 that includes the user attribute as a characteristic of its members. For example, since the user attribute A 210A is a characteristic of members of four user groups 1, 2, 5 and 9, the score assigned to the user attribute 210A can be 4 or based on the quantity 4. Similarly, the scores 220B, 220C, and 220D for user attributes 210B, 210C and 210D are 2, 2, and 1 respectively as shown in FIG. 2 as 220A-D. In some implementations, the score for a user attribute is based on the percentage of user groups in the list 215 that include the user attribute. Other scoring techniques that take into account the quantity of the user groups in a user's membership list can also be used to score the user attributes. Although this example shows the scoring of user attributes, similar techniques can be used to score user interests based on the quantity of user groups in the list 215 that include the topic.

In some implementations, the application 112 can also compute scores for a user attribute based on other user attributes and user interests of the user of the client device 110. For example, the application 112 can determine a score for the user attribute A 210A based on the user's group membership to a user group "User Attribute A Travel" that indicates a user group that includes users that are determined to have user attribute A and are interested in travelling. For example, a digital component provider 160 can generate multiple user groups where some of the user groups can be based on a different user interests. The digital component provider 160 can rank (or assign weights and/or score) these user interests indicating a priority for the digital component provider 160. For example, the digital component provider 160 may want to maximize the number of digital components delivered to the client device 110 related to a user group based on a user interest with the highest rank. In such implementations, if the user is a member of the user group such as "User Attribute A Travel" indicating user interest in travelling, the score assigned to the user attribute A can be based on the rank of the user interest travel. For example, the score of a user attribute A can be function of the quantity of user groups that includes the user attribute A as a characteristic of its members and the rank of the user interest travel as per the digital component provider 160.

Note that at least some of the user groups that the user is assigned to are based on the predicted user attributes of the user which are further based on the digital content accessed by the user in the past. The scores then indicate how common (or significant) the user attributes are among other user attributes.

In some implementations, the digital component provider 160 can assign weights to each user attribute. The weights assigned to the user attributes can be an indication of the likelihood of the user attributes assigned based on the user's online activity. For example, if a user has added a boot of size US 11.5 to the shopping cart and browses through sneakers, the digital component provider 160 can infer that that user likely has a shoe size of US 11.5 and assigns a higher weight to a user attribute "Shoe Size: US 11.5" and "Shoe Type: Sneakers" so as to be able to present digital components related to sneakers with shoe size US 11.5.

In some implementations, the digital component provider 160 can assign weights to each predicted user attribute based on the importance and/or priority of the predicted user attributes or types of use attributes. For example, the digital component provider 160 can value a particular user attribute more than the other attributes of the user of the client device 110. For example, it may be possible that a digital component provider 160 values user attribute age group over user attribute shoe size. In such implementations, the user attribute "Shoe Size: US 11.5" can be assigned a lower weight than the user's predicted age group.

In such implementations, the score assigned to each of the user attributes by the application 112 can be based on the weight assigned to the user attributes. For example, the score for a user attribute can be determined by multiplying the weight for the user attribute (or the type of user attribute) by the number of user groups in the list 215 that includes the user attribute. For example, if the weights assigned to user attribute 210A-D are 0.9, 0.5, 0.5 and 0.2 respectively, the score of each user attribute can be calculated as a function of the weights and the number of user groups in the list 215 for the user that include the user attributes. For example, if the function for generating score for a user attribute is a multiplication of the weights and the number of user groups, the scores assigned to user attribute 210A would be 3.6 (e.g., the count of 4 multiplied by the weight of 0.9). Likewise the scores for user attributes 210B-C would be 1, 1, and 0.2, respectively, in this example.

In some implementations, the application 112 can use the rules specified by the digital component provider 160 to use one of the conditional selection values that is different from the primary selection value. For example, the rules may cause the application 112 to use a conditional selection value that is higher than the primary selection value during the selection process of a digital component, if the digital component is directed to a user group that is based on a user attribute that was assigned a higher score than one or more other user attributes. For example, assume that the user of the client device 110 is a member of one or more user groups that include user attribute A as a characteristic of its members and one or more groups that include user attribute B as a characteristic of its members. Also assume that a digital component provider 160-1 wants to present a digital components to users that are predicted to have attribute A and digital component provider 160-2 wants to present digital components to users having user attribute B. The digital component provider 160-1 can specify rules that cause the application 112 to use a conditional selection value that is higher than the primary selection value if the score assigned to the user attribute A is higher than the score assigned to user attribute B so as to increase the chances of the digital component being selected during the selection process for presentation to users likely to have user attribute A. Following the rules stated by the digital component provider 160-1, the application 112 can use a conditional selection value in the selection process. Similarly other digital component providers 160-2 to 160-N can specify the rules to use a conditional selection value for digital components provided by them based on the scores assigned to the user attributes by the application 112.

As for another example, the rules may suggest the application 112 to use a conditional selection value that is higher than the primary selection value during the selection process of a digital component if the digital component is directed to a user group that is based on a user attribute that was assigned a higher score than a pre-specified threshold. For example, assume that the scores assigned to the user attributes by the application 112 is between 1 and 10 and that the user of the client device 110 is a member of the same user groups as the previous example and the score for user attribute A is greater than the score for user attribute B. The digital component provider 160-1 can specify rules that cause the application 112 to use a conditional selection value that is higher than the primary selection value if the score assigned to the user attribute A is higher than a pre-specified threshold (for e.g., pre-specified threshold value of 5) so as to increase the chances of the digital component provided by digital component provider 160-1 to get selected during the selection process for users likely to have user attribute A.

The rules can similarly be used to reduce the section values when the user attribute for a digital component is lower than the score for one or more other user attributes. Continuing the previous examples, if the score for user attribute A is lower than the score for user attribute B or lower than the threshold, the rules could cause the application to use a lower conditional selection value for the digital component of digital component provider 160-1 in place of the primary selection value.

In some implementations, the application 112 can be configured to adjust the selection value based on the scores for the user attributes and distribution criteria for the digital components. The distribution criteria for a digital component can indicate that the digital component is eligible for selection for users having a particular user attribute or that the selection value for the digital component can be increased for users having the particular user attribute. In this example, the application 112 can increase the selection value for the digital component when the user attribute specified by the distribution criteria has a score for the user that satisfies a threshold, e.g., by meeting or exceeding the threshold. In another example, the application 112 can increase the selection value for the digital component when the user attribute specified by the distribution criteria has a score for the user that is higher than one or more other user attributes (e.g., opposite user attributes or different attributes of the same type such as different age groups).

The application 112 can be configured to increase the selection value based on a magnitude of the score for the user attribute that matches the distribution criteria for the digital component and/or a difference between the score and either the threshold or the score for the other user attribute (s). For example, the selection value can be increased more for as the score exceeds the threshold or other score(s) by greater amounts. Similar techniques as those described above can be used to reduce the selection value when the user attribute specified by the distribution criteria for a digital component has a score that is less than the threshold and/or less than other user attributes of the same type.

In some implementations, after finalizing a selection value (primary or conditional selection value) for the digital components received from the content platform 150 and each digital component in the set of digital components received from the content distribution system 170, the application 112 selects a digital component based on the finalized selection value for presentation to the user. The application can then use the data related to the selected digital component to obtain and present the digital component in the digital component slot of the website 142.

In some implementations, the application 112 can also request the content platform 150 and/or the content distribution system 170 for updated selection values for each of the one or more digital components. In such implementations, the content platform 150 and/or the content distribution system 170 can update selection values for the one or more digital components and transmit the updated selection values to the application 112. The application 112 can select a digital component from the subset of digital components based on the updated selection values for presentation in place of the digital component slot of the website 142.

Though the explanation provided above is about selecting a single digital component, the techniques and methods can be used to select one or more digital components for presentation in either a single or multiple digital component slots. For example, the application 112 can select two or more digital components for presentation in two or more digital component slots of the website 142.

Figure 3:
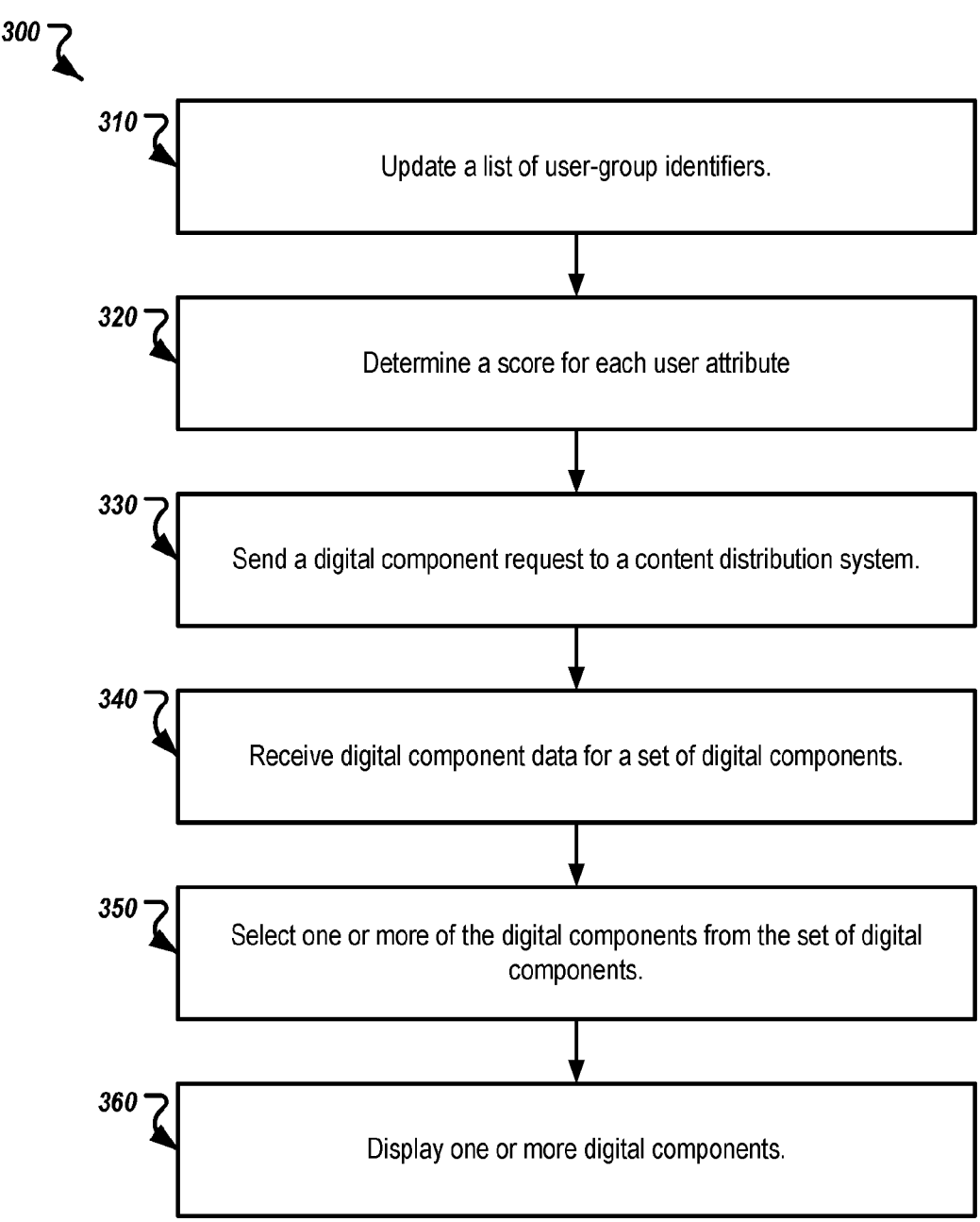
FIG. 3 is a flow diagram of an example process for selecting and displaying digital components.

FIG. 3 is a flow diagram that illustrates an example process 300 for selecting and distributing digital components to a client device. Operations of the process 300 can be implemented, for example, by the digital component provider 150 and content platform 160. Operations of the process 300 can also be implemented as instructions stored on one or more computer readable media which may be non-transitory, and execution of the instructions by one or more data processing apparatus can cause the one or more data processing apparatus to perform the operations of the process 300.

The application 112 of the client device 110 updates the list of user-group identifiers (310). If the user of the client device 110 uses the application 112 to visit a website 142 of the digital component provider 160, the web server hosting the website 142 can analyze the user activity of the user on the website 142 to predict one or more possible user attribute also referred to as predicted user attributes. For example, suppose a user is interested in purchasing shoes. The user can use a browser based application 112 to visit a website 142 of a foot wear manufacturer published by a web server. If the user browses through a particular shoe and adds the particular shoe of size "US 11.5" to the cart, the web server can request the browser application 112 of the client device 110 to add the user to a user group "Shoe Size US 11.5". If the browser application 112 accepts the request, the user group identifier "Shoe Size US 11.5" is added to the user group list.

After being requested to add the user of the client device 110 to a particular user group, the application 112 of the client device 110 can determine whether or not to add the user group identifier of the particular user group to the user group list. For example, the application 112 can be configured by the user to consider one or more conditions and/or settings before adding a user group identifier to the user group list. For example, the user of the client device 110 can configure the application 112 to prevent addition of user group identifier to the user group list.

The application 112 determines the score of each user attribute (320). For example, the application 112 can identify one or more user attributes from the user group identifiers in the user group list and score each user attribute based on the quantity of user-groups identified in the user group list that includes the user attribute as a characteristic of members of the user group. That is, the score for a user attribute can represent the quantity of user groups that the user has been assigned to that includes that user attribute. In other words, the score for a user attribute can represent how often publishers and/or digital component providers predicted that the user has that user attribute. Example techniques for determining a score for a user attribute are described above, e.g., with reference to FIG. 2.

The application 112 sends a digital component request to a content distribution system (330). When the application 112 loads a resource (or application content) that includes one or more digital component slots, the application 112 can request a digital component for each slot. The digital component slot can include code (e.g., scripts) that cause the application 112 to request a digital component from the content distribution system 170 and/or the content platform 150 for presentation to a user of the client device 110. For example, the code or the script of a digital component slot can enable the client device 110 to generate a packetized data request including a header and payload data.

To request digital components from the content distribution system 170, application 112 can generate a digital component request that is transmitted to the content distribution system 170. The content distribution system 170 can implement a trusted computing system. The application 112 can encrypt user group identifiers from the user group list and include the encrypted user group identifiers in the digital component request. The request is then transmitted to a trusted computing system. In some implementations, the content distribution system 170 can implement a MPC cluster 130 that further includes multiple computing systems, to choose digital components for presentation with the given electronic document. The application 112 can generate secret shares of the user group identifiers of the user group list and transmits the secret shares to a respecting computing system of the MPC cluster 130. The MPC cluster 130 can use the user group membership of a user to select digital components or other content that can be of interest to the user or can be beneficial to the user/user device in another way.

In some implementations, the application 112 can also request digital components from the content platform 150. For example, the application 112 can generate a contextual digital component request and transmit the contextual digital component request to the content platform 150. The contextual digital component request can include event data specifying features such as a name (or network location) of a server from which media is being requested, a name (or network location) of the requesting device (e.g., the client device 110). The digital component request is transmitted, by the application 112 of the client device 110, over the network 105 (e.g., a telecommunications network) to a server of the content platform 150.

The application 112 receives digital component data for a set of digital components (340). For example, if the content distribution system 170 is implemented as a trusted computing system that is trusted by other parties in the environment 100, the trusted computing system selects a set of digital components based on the user group membership of the user, identifies or generates a selection value (referred to as a primary selection value) for each digital component in the set of digital components, and identifies or generates one or more conditional selection values along with rules of using the one or more conditional selection values for each digital component in the set of digital components. If the content distribution system 170 is implemented as a MPC cluster 130, the MPC cluster 130 can use the user group membership of a user to perform one or more MPC processes to select a set of digital components for transmission to the client device 110. The digital components, primary selection values, and/or conditional selection values are then transmitted to the application 112 of the client device 110.

In response to receiving the contextual digital component request from the client device 110, the SSP can interact with a DSP to obtain digital components based on the contextual signals included in request. A DSP can receive requests for digital components (e.g., from an SSP), generate (or select) a selection parameter for one or more digital components created by one or more digital component providers 160 based on the request, and provide data related to the digital components (e.g., the digital components itself) and the selection parameters to an SSP. The SSP can then select one or more digital components and transmits data related to the digital components and the selection parameters to the application 112 of the client device 110.

The application 112 selects one or more digital components from the set of digital components (350). After receiving digital components from the content platform 150 and the content distribution system 170, the application 112 can select digital components for the digital component slots based on the selection value of the digital components. For example, the application 112 can select a digital component for a digital component slot that has a highest selection value compared to the selection values of the digital components. The application 112 can use the rules specified by the digital component provider 160 to use one of the conditional selection values that is different from the primary selection value. For example, the rules can cause the application 112 to use a conditional selection value that is higher and/or lower than the primary selection value during the selection process. Following the rules stated by the digital component provider 160-1, the application 112 can use a conditional selection value in the selection process. Similarly other digital component providers 160-2 to 160-N can specify the rules to use a conditional selection value for digital components provided by them based on the scores assigned to the user attributes by the application 112.

The application 112 can also request the content platform 150 and/or the content distribution system 170 for updated selection values for each of the one or more digital components. In such implementations, the content platform 150 and/or the content distribution system 170 can update selection values for the one or more digital components and transmit the updated selection values to the application 112.

The application 112 displays the one or more digital components on the client device 110 (360). After finalizing a selection value (primary or conditional selection value) for the digital components received from the content platform 150 and each digital component in the set of digital components received from the content distribution system 170, the application 112 selects a digital component based on the finalized selection value for presentation to the user. The application can then use the data related to the selected digital component to obtain and present the digital component in the digital component slot of the website 142. Likewise the application 112 can select one or more digital components for presentation on the client device 110 in one or more digital component slots of the resource.

Figure 4:
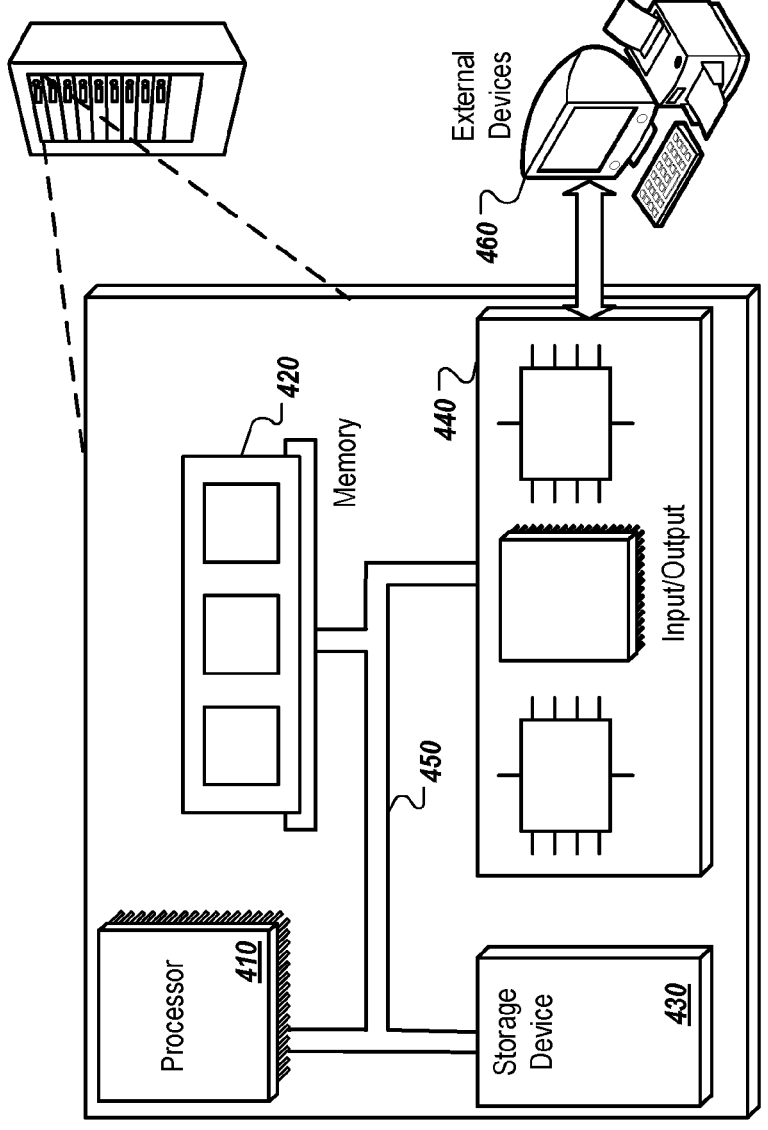
FIG. 4 is a block diagram of an example computer system.
Figure 4:

FIG. 4 is a block diagram of an example computer system 400 that can be used to perform operations described above. The system 400 includes a processor 510, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 5440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infra-structures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:

accessing, at a client device of a user, a list of user group identifiers that identify user groups that include the user as a member, wherein each user group has corresponding membership attributes that have to be matched by user attributes of users for the users to be included as members in the user group, wherein each user group includes a plurality of members, and wherein the membership attributes of each user group include at least one of (i) user characteristics or (ii) a topic of interest, and wherein the membership attributes of at least one user group includes both a user characteristic and a topic of interest;

assigning the user to a particular user group based on a prediction of user attributes of the user, wherein the predicted user attributes of the user are predicted based on content being accessed by the user or interaction by the user with the accessed content, and wherein the user is assigned to the particular user group based on the predicted user attributes of the user matching the membership attributes of the particular user group;

updating, at the client device of the user, the list of user group identifiers for the user to include a particular user group identifier that identifies the particular user group, wherein the list of user group identifiers includes at least one user group identifier for a user group to which the user was assigned by two or more content providers;

for each user attribute of a plurality of user attributes, determining, by the client device, a number of user groups identified in the list of group identifiers for the user that include the respective user attribute as a membership attribute;

determining, by the client device and for each user attribute of the plurality of user attributes, a respective score for the user attribute based on the determined number for the user attribute;

sending, by the client device and to a content distribution system, a digital component request comprising data representing the list of user-group identifiers;

receiving, by the client device and from the content distribution system, digital component data identifying a set of digital components selected based on the data of the digital component request;

selecting, by the client device based on the data identifying the set of digital components and the score for each user attribute, one or more of the digital components; and displaying, by the client device, the one or more digital components.

2. The computer-implemented method of claim 1, wherein the membership attributes of each user group comprises a combination of (i) a hash value computed based on a selected portion of the set of one or more user attributes of the user group and the one or more topics of the user group, and (ii) remaining user attributes and topics in the set of one or more user attributes of the user group and the one or more topics of the user group that were not used to compute the hash value.

3. The computer-implemented method of claim 1, wherein determining the score for each user attribute comprises determining the score for each user attribute based on respective weights assigned to the user attributes, wherein the respective weight of a user attribute indicates a priority of the user attribute with respect to other user attributes.

4. The computer-implemented method of claim 1, wherein selecting one or more of the digital components based on the data identifying the set of digital components comprises:

adjusting a selection value for each digital component in the set of digital components based on the score for each user attribute of the set of one or more user attributes for the user group, wherein the selection value for each digital component is an amount that a provider of the digital component is willing to provide to a resource publisher in response to the digital component being presented with a resource of the resource publisher; and selecting the one or more digital components based on the adjusted selection value for each digital component in the set of digital components.

5. The computer-implemented method of claim 4, wherein adjusting the selection value for each digital component in the set of digital components comprises increasing the selection value of a given digital component based on the set of one or more user attributes including a particular user attribute having a score that exceeds the scores of other user attributes.

6. The computer-implemented method of claim 4, wherein adjusting the selection value for each digital component in the set of digital components comprises decreasing the selection value of a particular digital component based on the set of one or more user attributes including a particular user attribute having a score is less than the scores of other user attributes.

7. The computer-implemented method of claim 1, wherein selecting, based on the data identifying the set of digital components and the score for each user attribute, one or more of the digital components comprises selecting the one or more digital components from a combination of the set of digital components and an additional set of digital components selected based on contextual signals related to an electronic resource with which the one or more digital components are displayed.

8. The computer-implemented method of claim 7, wherein the data of the digital component request comprises the contextual signals.

9. The computer-implemented method of claim 1, wherein:

the content distribution system comprises a multi-party computation (MPC) server;

the data representing the list of user-group identifiers comprises a secret share of the list; and selecting, based on the data identifying the set of digital components and the score for each user attribute, one or more of the digital components comprises the MPC server collaborating with one or more other MPC servers to select the one or more digital components based on the secret share of the list.

10. The computer-implemented method of claim 1, wherein selecting one or more of the digital components based on the data identifying the set of digital components comprises:

adjusting a selection value for each digital component in the set of digital components based on the score for each user attribute of the set of one or more user attributes for the user group, wherein the selection value for each digital component is an amount that a provider of the digital component is willing to provide to a resource publisher in response to the digital component being presented with a resource of the publisher, wherein adjusting the value of a particular digital component comprises:

determining that the particular digital component comprises distribution criteria that the digital component is eligible for distribution to users having a particular attribute; and adjusting the selection value for the particular digital component based on a magnitude of the score for the particular attribute; and selecting the one or more digital components based on the adjusted selection value for each digital component in the set of digital components.

11. The computer-implemented method of claim 1, wherein assigning the user to a particular user group based on a prediction of user attributes of the user comprises receiving, from a content provider, a request to add the user to the particular user group.

12. A client device comprising:

a memory device; and one or more processors configured to interact with the memory device and configured to perform operations, including:

accessing, at the client device of a user, a list of user group identifiers that identify user groups that include the user as a member, wherein each user group has corresponding membership attributes that have to be matched by user attributes of users for the users to be included as members in the user group, wherein each user group includes a plurality of members, and wherein the membership attributes of each user group include at least one of (i) user characteristics or (ii) a topic of interest, and wherein the membership attributes of at least one user group includes both a user characteristic and a topic of interest;

assigning the user to a particular user group based on a prediction of user attributes of the user, wherein the predicted user attributes of the user are predicted based on content being accessed by the user or interaction by the user with the accessed content, and wherein the user is assigned to the particular user group based on the predicted user attributes of the user matching the membership attributes of the particular user group;

updating, at the client device of the user, the list of user group identifiers for the user to include a particular user group identifier that identifies the particular user group, wherein the list of user group identifiers includes at least one user group identifier for a user group to which the user was assigned by two or more content providers;

for each user attribute of a plurality of user attributes, determining, by the client device, a number of user groups identified in the list of group identifiers for the user that include the respective user attribute as a membership attribute;

determining, by the client device and for each user attribute of the plurality of user attributes, a respective score for the user attribute based on the determined number for the user attribute;

sending, by the client device and to a content distribution system, a digital component request comprising data representing the list of user-group identifiers;

receiving, by the client device and from the content distribution system, digital component data identifying a set of digital components selected based on the data of the digital component request;

selecting, by the client device based on the data identifying the set of digital components and the score for each user attribute, one or more of the digital components; and displaying, by the client device, the one or more digital components.

13. A system of claim 12, wherein the membership attributes of each user group comprises a combination of (i) a hash value computed based on a selected portion of the set of one or more user attributes of the user group and the one or more topics of the user group, and (ii) remaining user attributes and topics in the set of one or more user attributes of the user group and the one or more topics of the user group that were not used to compute the hash value.

14. The system of claim 12, wherein determining the score for each user attribute comprises determining the score for each user attribute based on respective weights assigned to the user attributes, wherein the respective weight of a user attribute indicates a priority of the user attribute with respect to other user attributes.

15. The system of claim 12, wherein selecting one or more of the digital components based on the data identifying the set of digital components comprises adjusting a selection value for each digital component in the set of digital components based on the score for each user attribute of the set of one or more user attributes for the user group.

16. The system of claim 15, wherein adjusting the selection value for each digital component in the set of digital components comprises increasing the selection value of a given digital component based on the set of one or more user attributes including a particular user attribute having a score that exceeds the scores of other user attributes.

17. The system of claim 15, wherein adjusting the selection value for each digital component in the set of digital components comprises decreasing the selection value of a particular digital component based on the set of one or more user attributes including a particular user attribute having a score is less than the scores of other user attributes.

18. The system of claim 12, wherein selecting, based on the data identifying the set of digital components and the score for each user attribute, one or more of the digital components comprises selecting the one or more digital components from a combination of the set of digital components and an additional set of digital components selected based on contextual signals related to an electronic resource with which the one or more digital components are displayed.

19. The system of claim 18, wherein the data of the digital component request comprises the contextual signals.

20. A computer readable medium storing instructions that, when executed by one or more data processing apparatus of a client device, cause the one or more data processing apparatus to perform operations comprising:

accessing, at the client device of a user, a list of user group identifiers that identify user groups that include the user as a member, wherein each user group has corresponding membership attributes that have to be matched by user attributes of users for the users to be included as members in the user group, wherein each user group includes a plurality of members, and wherein the membership attributes of each user group include at least one of (i) user characteristics or (ii) a topic of interest, and wherein the membership attributes of at least one user group includes both a user characteristic and a topic of interest;

assigning the user to a particular user group based on a prediction of user attributes of the user, wherein the predicted user attributes of the user are predicted based on content being accessed by the user or interaction by the user with the accessed content, and wherein the user is assigned to the particular user group based on the predicted user attributes of the user matching the membership attributes of the particular user group;

updating, at the client device of the user, the list of user group identifiers for the user to include a particular user group identifier that identifies the particular user group, wherein the list of user group identifiers includes at least one user group identifier for a user group to which the user was assigned by two or more content providers;

for each user attribute of a plurality of user attributes, determining, by the client device, a number of user groups identified in the list of group identifiers for the user that include the respective user attribute as a membership attribute;

determining, by the client device and for each user attribute of the plurality of user attributes, a respective score for the user attribute based on the determined number for the user attribute;

sending, by the client device and to a content distribution system, a digital component request comprising data representing the list of user-group identifiers;

receiving, by the client device and from the content distribution system, digital component data identifying a set of digital components selected based on the data of the digital component request;

selecting, by the client device based on the data identifying the set of digital components and the score for each user attribute, one or more of the digital components; and displaying, by the client device, the one or more digital components.

21. The computer readable medium of claim 20, wherein the membership attributes of each user group comprises a combination of (i) a hash value computed based on a selected portion of the set of one or more user attributes of the user group and the one or more topics of the user group, and (ii) remaining user attributes and topics in the set of one or more user attributes of the user group and the one or more topics of the user group that were not used to compute the hash value.

\* \* \* \* \*